United States Patent [19]

Byrd, Jr.

[11] 4,123,886

[45] Nov. 7, 1978

[54] REFRACTORY FIBER BLANKET MODULE WITH INCREASED INSULATION

[75] Inventor: Carlisle O. Byrd, Jr., Houston, Tex.

[73] Assignee: Johns-Manville Corporation, Denver, Colo.

[21] Appl. No.: 757,750

[22] Filed: Jan. 7, 1977

Related U.S. Application Data

[63] Continuation-in-part of Ser. No. 603,391, Aug. 11, 1975, Pat. No. 4,001,996, which is a continuation-in-part of Ser. No. 475,439, Jun. 3, 1974, Pat. No. 3,952,470.

[51] Int. Cl.[2] .......................... E05B 1/80; C04B 43/02

[52] U.S. Cl. .......................................... 52/509; 52/506; 52/511; 156/93; 156/94; 264/30; 428/99; 428/234; 428/285

[58] Field of Search ................. 428/99, 102, 234, 284, 428/285, 920; 52/227, 232, 404, 406, 596, 598, 622, 514; 110/1 A, 1 B; 266/281, 283, 285; 264/30; 156/71, 93, 94

[56] References Cited

U.S. PATENT DOCUMENTS

| | | | |
|---|---|---|---|
| 2,454,175 | 11/1948 | Hlavaty | 428/113 |
| 2,694,025 | 11/1954 | Slayter et al. | 428/102 |
| 2,726,977 | 12/1955 | See et al. | 428/102 X |
| 3,523,395 | 8/1970 | Rutter et al. | 52/506 X |
| 3,605,370 | 9/1971 | Prible | 52/513 X |
| 3,819,468 | 6/1974 | Sander et al. | 52/270 X |
| 4,001,996 | 1/1977 | Byrd, Jr. | 52/506 X |

*Primary Examiner*—Alfred C. Perham
*Attorney, Agent, or Firm*—Robert M. Krone; Joseph J. Kelly; James W. McClain

[57] ABSTRACT

Existing refractory fiber blanket furnace lining systems receive a layer of high temperature ceramic fiber blanket or felt on an inner surface portion, or hot face, thereof exposed to interior conditions of the furnace. The layer is attached to the module by being sewn thereto with continuous filament ceramic fiber thread. The layer can be added to increase insulation capacity on lower temperature furnace insulation or to repair damaged insulation in a furnace.

5 Claims, 4 Drawing Figures

REFRACTORY FIBER BLANKET MODULE WITH INCREASED INSULATION

CROSS-REFERENCE TO RELATED APPLICATIONS

This application is a continuation-in-part of copending U.S. patent application Ser. No.603,391, filed Aug. 11, 1975, now U.S. Pat. No. 4,001,996, which in turn is a continuation-in-part of U.S. patent application Ser. No. 475,439, filed June 3, 1974 now U.S. Pat. No. 3,952,470. Other continuations-in-part of these parent applications are U.S. patent applications Serial Nos. 757,749 and 757,748 filed of even date herewith. Another related application is U.S. patent application Ser. No. 757,772, filed of even date herewith, now U.S. Pat. No. 4,086,737.

BACKGROUND OF THE INVENTION

1. Field of Invention

The present invention relates to modular refractory fiber blanket furnace lining systems.

2. Description of Prior Art

Refractory fiber blankets made from refractory materials such as chromia-alumina-silica, alumina-silica compositions and zirconia compositions have become desirable as furnace insulation because of their ability to withstand high temperatures. The fiber blanket material has been attached in a layered construction arrangement to the furnace wall using attachment structure, as exemplified in U.S. Pat. Nos. 3,523,395 and 3,605,370. Another technique is to fabricate the refractory fiber blankets into modules, as in U.S. Pat. No. 3,952,470, of which applicant is inventor.

While layered refractory fiber blankets and refractory fiber blanket modules are becoming more readily acceptable in the furnace insulation industry, certain problems exist. For example, several types of refractory fiber blankets are available, each having a different temperature rating. Further, the blankets generally increase in cost as temperature ratings increase. It is desirable, however, to use as much lower cost material as possible while making sure that specified temperature insulation limits were met.

A second problem is that of damage to the fiber blanket once installed. For economic reasons, it is often virtually prohibitive in cost to replace a large layered blanket module, which might be from fifty to two hundred square feet in surface area, which has only a relatively small damaged area. However, unless replaced, the damaged area would grow in size.

Other types of insulation structure, such as fibrous batting, in which the layers were bound together by glue, as exemplified in U.S. Pat. No. 2,454,175, were unsatisfactory for several reasons, for example, ease of installation and repair, cost of fabrication and inadequate ability to withstand high temperatures.

SUMMARY OF INVENTION

Briefly, the present invention relates to apparatus to improve the insulation capacity of refractory fiber blanket furnace insulation, whether of modular or layered construction. The present invention also relates to a method of repairing damaged areas of refractory fiber blanket furnace lining systems.

A layer of high temperature ceramic felt or blanket, preferably having a temperature rating in excess of 2600° F., is attached to the hot face of refractory fiber blanket furnace insulation, either in the form of a module or block, or in the form of layered construction. The high temperature blanket is attached to the refractory fiber blanket by being sewn thereto with continuous filament, high temperature metal oxide thread. In this manner, the insulation capacity of lower temperature refractory fiber blanket furnace insulation is increased.

Further, the ceramic fiber blanket may be used to repair damaged areas of refractory fiber blanket in furnaces by being attached thereto according to the present invention. Preferably, the ceramic fiber blanket is attached to cover the damaged insulation areas by means of metal oxide threads.

DESCRIPTION OF THE PREFERRED EMBODIMENT

Figure 1:
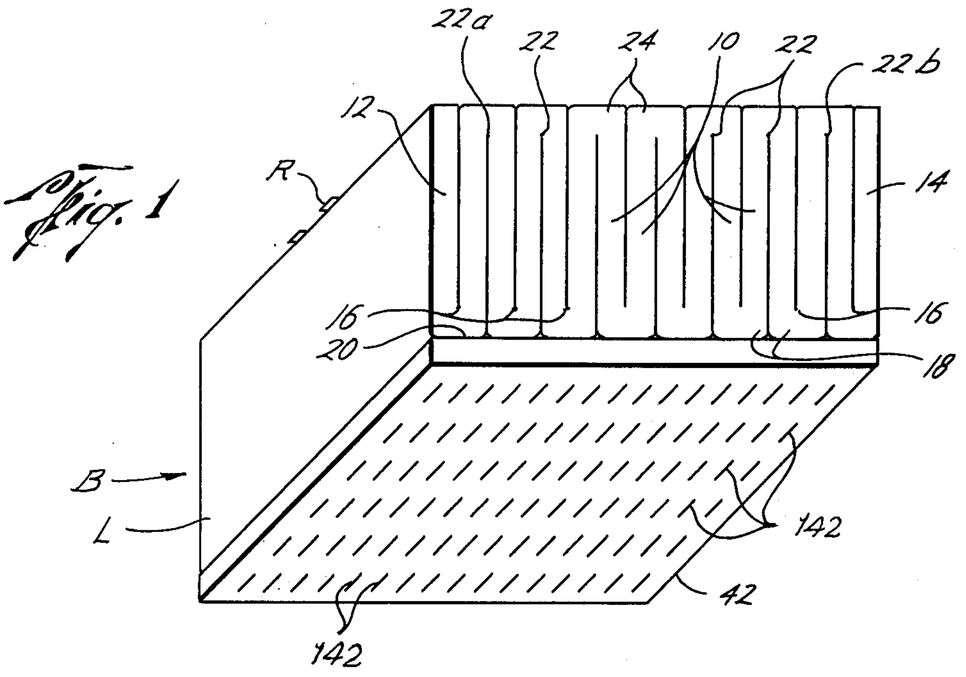
FIGS. 1 and 3 are isometric views of insulating blocks according to the present invention.

In the drawings, the letter B designates generally an insulating block according to the present invention for lining a wall (not shown), which may be either a side wall or a roof of a furnace or of some other high temperature equipment, such as soaking pits, annealing furnaces, stress relieving units and the like. The insulating block B is formed from a folded refractory fiber insulating blanket L. A suitable example of such a blanket is the type of commerically available needled ceramic fiber sheet, such as the type, sold by the Johns-Manville Company, under the trademark CERA-BLANKET containing alumina-silica fibers or other suitable commerically available refractory fibrous materials. It should be understood that the particular component materials of the ceramic fiber sheet used in the blankets are selected based upon the range of temperatures in the high temperature equipment in which the apparatus is to be installed.

Figure 3:
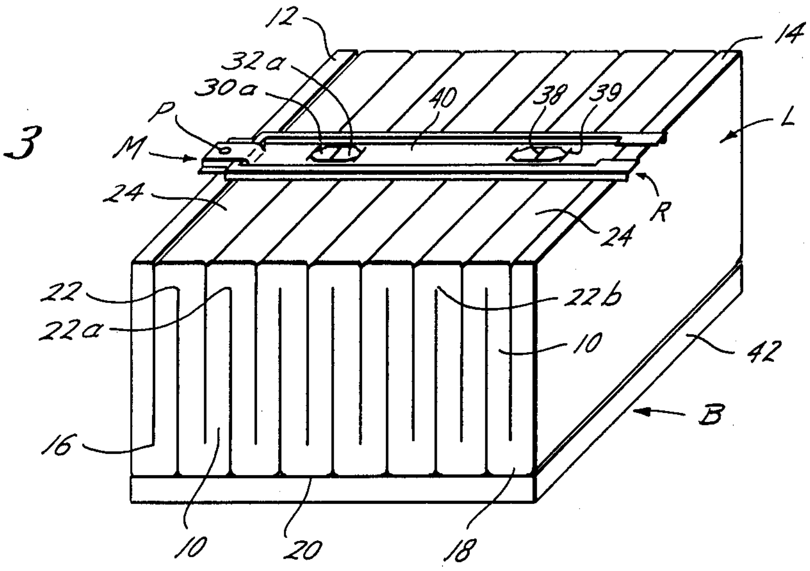

In the block B (FIGS. 1 and 3), the blanket L is folded into adjacent layers 10 mounted sinuously and extending inwardly and outwardly in such a sinuous manner between a first end layer 12 and a second end layer 14 at opposite ends of the attachment mounting or channel M. Adjacent ones of the layers 10 and those layers 10 adjacent the end layers 12 and 14 form inner folds 16 adjacent inner end portions 18 of the blanket L near an insulation surface 20, or "hot face" as termed in the art, exposed to interior conditions in the high temperature equipment. Outer folds 22 are formed between adjacent layers 10 at an opposite and adjacent outer end portions 24 at positions intermediate each of the inner folds 16.

The blanket L is supported at certain of the outer folds 22, designated 22*a* and 22*b* (FIGS. 1 and 3) by a support beam 26, details of which are set forth in an alternate blanket embodiment (FIG. 4) of a support S mounted in the folds 22. The support beam 26 is formed from a folded bar of a high temperature-resistant metal or alloy or other suitable material, although other shapes of support beams and materials may be used, as set forth in U.S. Pat. No. 3,952,470. The support beam 26 is mounted at a center portion 26*a* (FIG. 4) thereof within a loop 28 formed at a lower end juncture of suspension arms 30 and 32 of a suspending wab or support tab T of the attachment mounting M. The support beam 26 may be welded, such as by spot welding, and the loop 28 and the suspension arms 30 and 32 welded together for additional strength and support, if desired.

Alternately, the support tab T may be formed with a single suspension arm. An opening is formed in the center portion 26a of the U-shaped support beam 26, and the single suspension arm inserted to extend through such opening. The portion of the suspension arm extending through the opening is then bent to fit against one side of the support beam and secured to the support beam 26 by spot welding the suspension arm thereto.

In the layers of the blanket L, the fibers of material normally extend longitudinally within the layer. Additionally, however, it should be understood that the fibers of the adjacent layers may be needled together in the manner set forth in detail in allowed co-pending U.S. patent application No. 603,391, now U.S. Pat. No. 4,001,996, set forth above, if desired. As a result of needling, the direction of the orientation of certain of the fibers in the blanket L is changed from the normal longitudinal extension to a position where fibers in adjacent layers are transversely disposed to the remainder of the fibers and extend into other adjacent layers to bind the layers together into an insulating block. In this manner, the perpendicular fibers bind the adjacent lamina or layers of the blanket together, compacting and strengthening the blanket.

Figure 4:
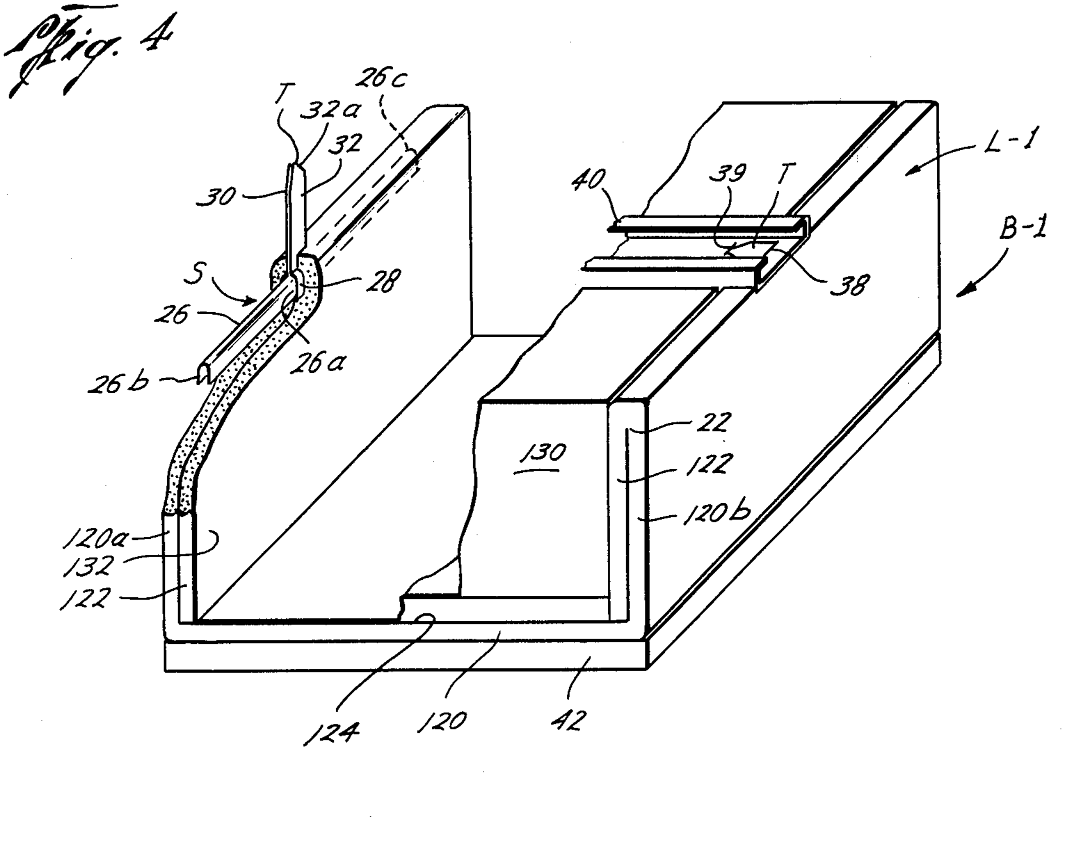
FIG. 4 is an isometric view of an alternative embodiment of insulating blocks according to the present invention.

An opening is formed through the outer end portions 24 of the blanket L adjacent the fold 22 receiving the support beam 26 (FIG. 4). The opening so formed extends upwardly through the blanket L from the fold 22 for passage of the suspension arms 30 and 32 through the blanket L.

Mounting lugs 30a and 32a, formed at upper ends of the suspension arms 30 and 32, respectively, of eaeh of the support tabs T extend upwardly through mounting orifices 38 in a central attachment channel or a stringer channel member 40 of the attachment mounting M. The mounting lugs 30a and 32a are folded downwardly against the stringer channel member so that the block B may be mounted against the wall. The ends of mounting lugs 30a and 32a may in addition, if desired, be inserted to extend downwardly through mounting orifices 39 in the attachment mounting M so that sharp ends of the tabs T are enclosed beneath the attachment mounting M. The insertion of the ends of the lugs 30a and 32a through the mounting orifices 39 protects the hands of installers against points or sharp surfaces at the ends and, in addition, further strengthens the connection of the supports to the attachment mounting M.

Additionally, each of the attachment mountings M has an attachment receptacle R formed at an end thereof and an attachment pin member P formed at an end opposite the attachment receptacle R. The attachment receptacle R of the apparatus receives the attachment pin P of an adjacent block of the apparatus, while the attachment pin P extends outwardly beyond the preformed insulation block B to provide access for welding in order to mount the block to the furnace wall. After such mounting, the pin P is fitted into an attachment receptacle R of another adjacent block B.

In certain instances, it is desirable to increase the temperature rating of the block B. However, to replace the entire blanket in the block B with fiber blanket of higher temperature rating unduly increases the cost. Accordingly, with the present invention, a refractory ceramic fiber felt or blanket 42 of increased temperature rating is attached to the hot face 20. A suitable material, for example, could be the material used in the blanket L above. For higher temperature insulating purposes, materials such as the insulating material sold under trademark by the Johns-Manville Company as CERA-CHROME could be used, if desired. These latter high temperature materials typically have a temperature rating in excess of 2600° F., usually in the range of from 2600°–3000° F. It has been found with the present invention that overall temperature characteristics of the block B can be markedly increased without a corresponding increase in material costs.

However, due to the temperature conditions expected near the blanket 42 due to interior conditions in the furnace being insulated, the structure for attaching the blanket 42 to the block B becomes critical. With the present invention, a thread 142 of metal oxide, preferably a continuous filament metal oxide thread, is used to attach the blanket 42 to the hot face 20 of the block B. A suitable such thread is that sold by 3M Company of St. Paul, Minn. and designated Ceramic Fiber AB-312. Such fibers are continuous filament fibers of alumina-boria-silica composition, with further details thereof being set forth in Design News magazine in the May 10, 1976 issue. These fibers are there stated to withstand continuous usage temperatures of 2600° F.

Figure 2:
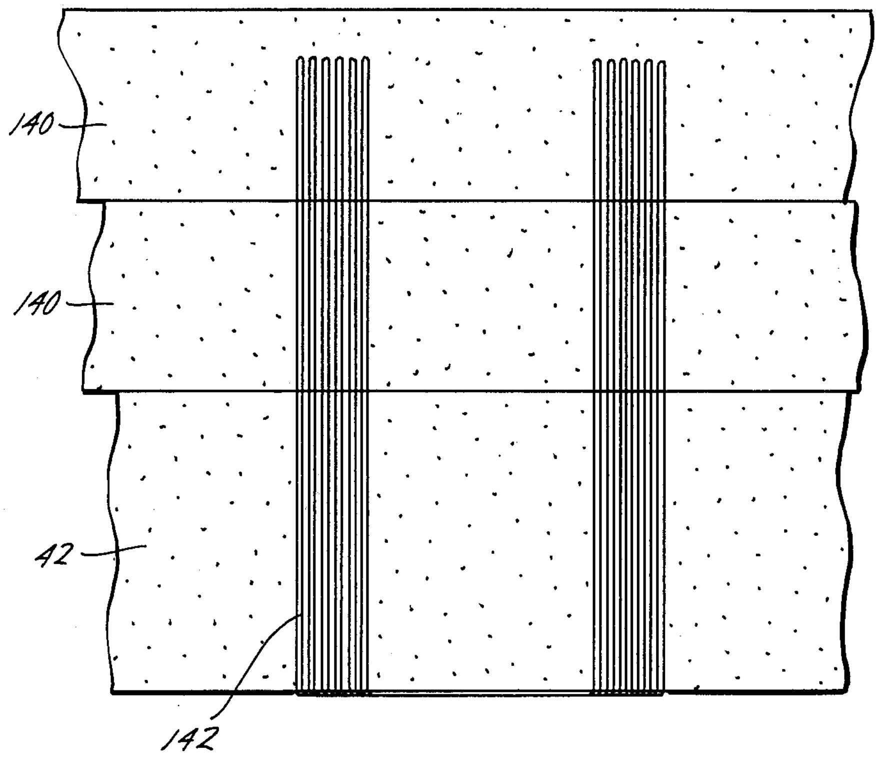
FIG. 2 is a cross-sectional view of layered refractory fiber blanket modified according to the present invention.

The blanket 42 is attached by being sewn either by hand or machine with continuous fiber metal oxide thread 142 to the hot face 20 of the block B in a like manner to an alternative embodiment (FIG. 2). Strands of the thread are moved through the blanket 42 and underlying layers of the refractory fiber blanket, so that the thread is effectively interlocking the blanket 42 with the underlying refractory fiber blanket of the block B.

In this manner, the modular refractory fiber insulating block B, whether already installed in a furnace or as single modules not yet installed may be modified to increase the temperature characteristics thereof without unduly increasing the costs thereof. The uninstalled block B, when formed in the manner set forth above, is then attached to the wall of the furnace or high-temperature equipment in the manner set forth in Applicant's parent application referenced above, now U.S. Pat. No. 3,952,470.

In addition to the first embodiment set forth above, the invention may take the form of several other embodiments. In such embodiments, like structure performing like functions bears like reference numerals.

For example, second embodiment B-1 (FIG. 4), a blanket L-1, formed from a single piece of suitable ceramic fiber insulating material, is first folded to form an inner surface portion 120c which is exposed along an interior insulation surface 120, or "hot face," to interior conditions in the high temperature equipment. Side surface portions 120a and 120b of the blanket L–1 extend outwardly from each end of the inner surface portion 120c toward the wall of the furnace to a fold 22 formed therein for receiving a support S in the manner previously set forth. Inner wall member portions 122 adjacent the side surface portions 120b and 120c, respectively, extend inwardly from the fold 22 to an interior surface 124 of the inner surface portion 120c opposite the insulation surface 120 thereof.

The inner wall member portions 122 and the side surface portions 120a and 120b, respectively, may, if desired, be needled together in the manner set forth above. The block B-1 has suitable attachment structure, in a like manner to the block B, by which it may be mounted to the furnace wall in a like manner to either the block B or co-pending U.S. application Ser. No. 603,391 set forth above.

A large mass of bulk ceramic fiber 130, or other lower temperature rated insulation refractory material of lower cost, is placed in an enclosure or pocket formed by surfaces 132 of the inner wall member portions 122, the interior surface 124 of the inner surface portion 120*c*, and the attachment structure M which attaches the insulating block B-1 to the wall of a furnace. This bulk material may be contained temporarily in a plastic or fiber container which will burn and be consumed when the insulating block is exposed to the heat of the furnace.

Where suitable, fiber insulating board or mats may be used in place of the mass 130 of bulk ceramic fibers, as set forth in copending U.S. application Ser. No. 603,391, previously referenced.

Further, the block B-1, in a like manner to the block B, has a ceramic blanket 42 of the high temperature rating of the type set forth above attached thereto by metal oxide thread of the type set forth. Accordingly, the temperature characteristics of the block B-1 are improved, as was the case with the block B.

The present invention is further adapted for use with layered refractory fiber blanket furnace insulation. In FIG. 2, a plurality of layers 140 of refractory fiber blanket are shown mounted installed in a substantially parallel arrangement with the wall of a furnace using any conventional arrangement. When so installed, the high-temperature blanket 42 is attached to the outermost or hot face refractory fiber blanket by being sewn thereto. As the thread 142 repeatedly passes through the high temperature blanket and the underlying layers 140, such thread becomes interlocked with the fibers of the layers 140, mounting the high-temperature blanket 42 therewith. Thus, layered refractory fiber blanket furnace insulation may be increased in temperature rating according to the present invention.

Further, when refractory fiber blanket furnace insulation, whether modules or layered construction, becomes damaged in use, the high-temperature blanket 42 may be used to repair damaged areas. A blanket 42 of sufficient size to cover the damaged area is placed over the damaged area covering same and attached thereto with continuous fiber metal oxide thread 142 in the manner set forth above.

Although the present invention is described in the preferred embodiment as insulating a furnace or forming a furnace wall, it should be understood that the apparatus of the present invention is also suitable to insulate or form cryogenic, or low temperature equipment, as well.

It should further be understood that, in addition to the blocks B and B-1 set forth above, other insulating blocks of the type set forth in allowed copending U.S. patent application Ser. No. 603,391 now U.S. Pat. No. 4,001,996, may be modified and repaired according to the present invention. Accordingly, the structure of the remaining blocks of such application are herein incorporated by reference.

The foregoing disclosure and description of the invention are illustrative and explanatory thereof, and various changes in the size, shape, and materials, as well as in the details of the illustrated construction may be made without departing from the spirit of the invention.

I claim:

1. An insulating block for lining a wall of a furnace and like equipment comprising:

(a) an insulating blanket folded into a plurality of adjacent layers of fiber insulating material and having folds formed between said adjacent layers alternately at outer and inner ends thereof, respectively;

(b) means for attaching said insulating blanket to the wall of the furnace, said means for attaching including a support member mounted in at least one of said outer folds;

(c) said insulating blanket further including inner end portions connecting adjacent layers of said blanket at inner ends thereof to form said inner folds;

(d) said inner end portions having fibers transversely disposed to the direction of the heat flow towards the furnace wall to increase the insulating capacity of said insulating block; and (e) a ceramic fiber blanket mounted with said insulating blanket along said inner end portions and covering same, said ceramic fiber blanket further being attached to said insulating blanket by high temperature metal oxide thread.

2. The structure of claim 1, wherein:

a portion of said folds being transversely disposed to the remainder of said fibers and extending into other adjacent layers to bind the layers together into an insulating block.

3. The structure of claim 1, wherein:

said ceramic fiber blanket has a temperature rating in excess of 2600° F.

4. The structure of claim 1, wherein:

said ceramic fiber blanket has a temperature rating range of from 2600° F. to 3000° F.

5. The structure of claim 1, wherein:

said thread comprises continuous filament high temperature metal oxide thread.

* * * * *